(12) United States Patent
Astrom et al.

(10) Patent No.: US 9,549,005 B2
(45) Date of Patent: Jan. 17, 2017

(54) AUXILIARY SIP SERVICES (75) Inventors: Bo Astrom, Stockholm (SE); Mats Stille, Bromma (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 980 days.

(21) Appl. No.: 13/058,399

(22) PCT Filed: Aug. 11, 2008

(86) PCT No.: PCT/EP2008/060546
§ 371 (c)(1),
(2), (4) Date: Feb. 10, 2011

(87) PCT Pub. No.: WO2010/017834
PCT Pub. Date: Feb. 18, 2010

(65) Prior Publication Data
US 2011/0134913 A1 Jun. 9, 2011

(51) Int. Cl.
*H04L 29/06* (2006.01)
*H04L 12/58* (2006.01)
*H04M 15/00* (2006.01)
*H04L 29/12* (2006.01)

(52) U.S. Cl.
CPC ......... *H04L 65/1096* (2013.01); *H04L 12/582* (2013.01); *H04L 29/06176* (2013.01); *H04L 65/1006* (2013.01); *H04L 65/1089* (2013.01); *H04L 65/4007* (2013.01); *H04M 15/63* (2013.01); *H04L 29/12764* (2013.01)

(58) Field of Classification Search
CPC ................... H04L 29/12764; H04L 29/06176; H04L 12/582; H04M 15/63
See application file for complete search history.

(56) References Cited

U.S. PATENT DOCUMENTS

2003/0224781 A1* 12/2003 Milford et al. ............. 455/426.1
2005/0289097 A1* 12/2005 Trossen et al. .................... 707/1
2008/0089344 A1* 4/2008 Jansson et al. ............ 370/395.2

FOREIGN PATENT DOCUMENTS

EP 1858218 A1 11/2007

OTHER PUBLICATIONS

Loreto, S. and Camarillo, G. "The Session Initiation Protocol (SIP) Same-Session Header Field." IEFT SIPPING Working Group, Internet Draft, Ericsson, Jun. 25, 2006.*

(Continued)

*Primary Examiner* — Andrew Chriss
*Assistant Examiner* — Salvador E Rivas
(74) *Attorney, Agent, or Firm* — Patents on Demand P.A.; Brian K. Buchheit; Scott M. Garrett (57) ABSTRACT

The invention includes a method of providing media data of a SIP-based Auxiliary Service from an Auxiliary Application Server, AS, to a recipient peer of an established communication exchange between peers. The method includes issuing an invocation to the Auxiliary AS, the invocation including an indication of the recipient peer of the Auxiliary Service. The Auxiliary Service media data is prepared and sent to the recipient together with a correlation ID identifying the established communication exchange, and an Application Classmark identifying the auxiliary service.

24 Claims, 4 Drawing Sheets

(56) References Cited

OTHER PUBLICATIONS

Loreto, S. et al. "The Session Initiation Protocol (SIP) Same-Session Header Field." IEFT SIPPING Working Group, Internet Draft, Ericsson, Feb. 16, 2006.
Rosenberg, J. "Identification of Communications Services in the Session Initiation Protocol." IETF SIPPING, Internet-Draft, Cisco, May 7, 2007.
Rosenberg, J. "Identification of Communications Services in the Session Initiation Protocol." IETF SIPPING, Internet-Draft, Cisco, Jul. 14, 2008.
Drage, K. "A Session Initiation Protocol (SIP) Extension for the Identification of Services." IETF Network Working Group, Alcatel-Lucent, Jul. 9, 2007.

* cited by examiner

Figure 4

AUXILIARY SIP SERVICES

TECHNICAL FIELD

The present invention relates to the provision of Session Initiation Protocol (SIP) based auxiliary services to an established communication.

BACKGROUND

IP Multimedia services provide a dynamic combination of voice, video, messaging, data, etc. within a communication session. It is also possible to combine media in a session, and the number of services offered to end users continues to grow, enriching the inter-personal communication experience. The IP Multimedia Subsystem (IMS) is the technology defined by the Third Generation Partnership Project (3GPP) to provide IP Multimedia services over mobile communication networks. The IMS provides key features to enrich the end-user person-to-person communication experience through the use of standardised IMS Service Enablers, which facilitate new rich person-to-person (client-to-client) communication services as well as person-to-content (client-to-server) services over IP-based networks.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, the IMS introduces additional functionality for e.g. subscription handling, security and charging to allow operators and service providers to control user access to services and to charge users accordingly.

Figure 1:
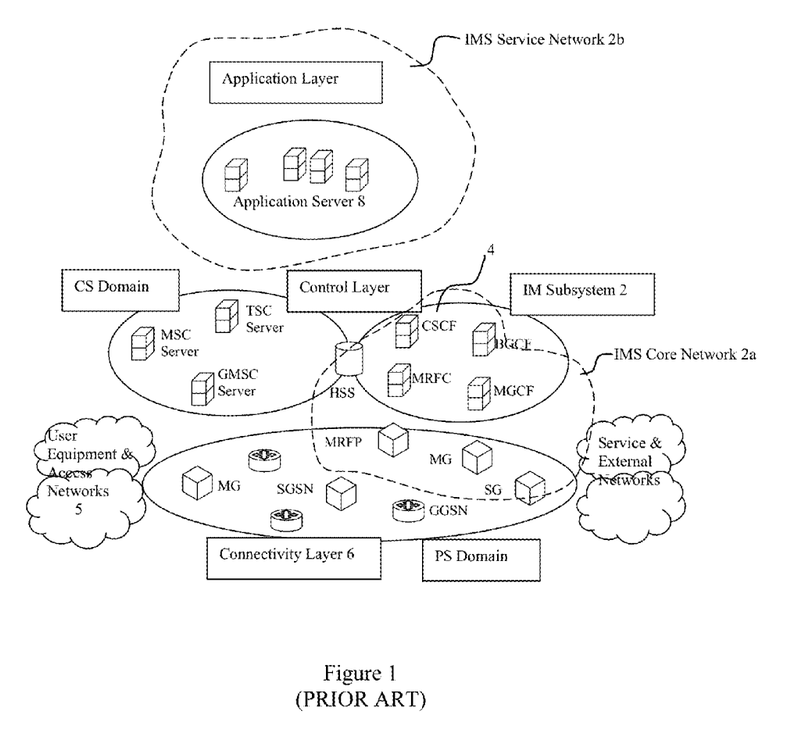
FIG. 1 is a schematic representation showing how the IMS fits into the mobile network architecture of a GPRS/PS access network.

FIG. 1 illustrates schematically how the IMS 2 fits into the mobile network architecture in the case of a GPRS/PS access network. Call/Session Control Functions (CSCFs) 4 operate as SIP proxies within an IMS core network 2a. A user accesses the IMS 2 via an access network 5 and gateway nodes in a connectivity layer 6. The user must register with the IMS using the specified SIP REGISTER method in order to gain access to IMS services. A Home Subscriber Server HSS keeps a log of users' subscription profiles that define the services that the user has subscribed to. After registering, the user is able to establish a communication session with other peers, making use of the multimedia capabilities of the IMS. The IMS also includes a service network 2b, in which Application Servers (ASs) 8 are provided for implementing IMS service functionality. Application Servers 8 provide services to the end-users, and may be connected either as end-points over the 3GPP-defined Mr interface, or "linked in" (invoked) by an S-CSCF over the 3GPP-defined ISC interface.

Figure 2:
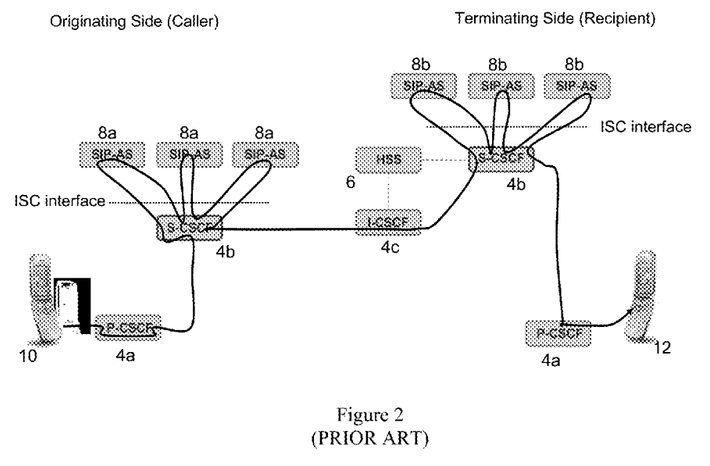
FIG. 2 is a schematic illustration of a session path during the establishment phase of a SIP session in accordance with known current practice.

SIP and IMS architectures are centred around a "call" model where services offered to end users are provided by either device applications or Application Servers in the network. FIG. 2 is a schematic illustration of a session path during the establishment phase of a SIP session in accordance with known current practice. This shows how a call/session between an originating peer (caller) 10 and terminating peer (recipient) 12 is currently established in the IMS. Each peer 10, 12 operates a SIP terminal, and is registered with an IMS network. Thus, as shown in FIG. 2, there is an IMS network on the originating side and an IMS network on the recipient side. The 3GPP architecture defines three types of CSCFs: the Proxy CSCF (P-CSCF) 4a which is the first point of contact within the IMS for the caller 10 and recipient 12; the Serving CSCF (S-CSCF) 4b controls the provision of services to the users in accordance with the user's subscription; and the Interrogating CSCF (I-CSCF) 4c whose role is to identify the correct S-CSCF 4b, based on the user's subscription profile which it obtains from the user's HSS 6, and to forward to that S-CSCF a request received from a SIP terminal via a P-CSCF 4a. Services requested by the peers 10, 12 are identified at the session initiation stage and are provided by linking in the appropriate Ass 8a, 8b, in the IMS networks.

Currently SIP technology (as described in the Internet Engineering Task Force Request for Comments, IETF RFC 3261) provides for sessions to be established between communicating parties and for the media transfer between peers to be associated with a certain session or "call". This call/session is handled by an application, typically implemented as a device application and sometimes with network support by an application server (AS 8). The device application provides the graphical user interface, GUI, implemented for the service (e.g. for a videotelephony call). The session is set up in an initial condition, making use of an initial media service, or set of media services provided by one or more ASs. Once the session is established, the initial media can either be replaced by another type of media, or additional media can be added between the parties. For example, initial audio can be replaced by video, or video can be added to initial audio creating a videotelephony service.

The device application responsible for the GUI and SIP session handling has no problem when changes are made to the services provided within the same session—i.e. when the change is initiated by one of the communicating peers. WO2006/125471 describes the inclusion of service identifiers as feature tags in SIP messages. The service identifiers identify a particular communication service to which a SIP message relates. This application also describes a MCS-qualifier that enables an application to correlate several simultaneous IMS sessions. An Internet Engineering Task Force (IETF) Sipping Working Group Internet Draft, dated Jun. 25, 2006 but now expired, describes a "Same-Session" SIP header field to logically correlate an existing SIP dialog with a new dialog.

However, it is not currently possible for a third party source to initiate the addition of media to an established SIP session such that the additional media is associated with the established SIP session. Also, not all IP media communications occur during established SIP sessions. There are many communications, or SIP transactions, in which a message is sent from one network source, such as a user terminal or an AS, to another user's SIP terminal but which does not entail establishing a session. Examples include notifications sent from the IMS to a registered user terminal by exchange of SIP MESSAGEs such as might occur as communications in a game being played between two peers. Again, there is currently no method to enable a third party source to add service media or functionality to these communications.

At present, for an AS to provide a service at any time during the lifetime of a session, it must be linked in during the establishment phase. It cannot be linked in later, due to inherent characteristics of the SIP protocol. In many cases this is not a problem (e.g. when providing telephony-like services to voice over IP calls). However, for other services it is a severe restriction or is wasteful of resources, especially for services that are only needed conditionally. In such cases, it is at present necessary to always link these services into the session path at session establishment, which leads to longer call set-up times and ties up unused resources.

SUMMARY

Embodiments herein advantageously allow third party services to add media or functionality to ongoing SIP sessions, or to SIP transactions between peers. These "helper" services are herein referred to as Auxiliary Services, provided by Auxiliary Application Servers.

According to a first aspect of the present invention there is provided a method of providing media data of a SIP-based Auxiliary Service from an Auxiliary Application Server, AS, to a recipient peer of an established communication exchange between peers. The method includes issuing an invocation to the Auxiliary AS, the invocation including an indication of the recipient peer of the Auxiliary Service. The Auxiliary Service media data is prepared and sent to the recipient together with a correlation ID identifying the established communication exchange, and an Application Classmark identifying the auxiliary service.

The established communication exchange may be a SIP session or a session-less transaction. The session-less transaction may comprise a SIP Message, or other session-less delivery methods such as an SMS message, an MMS message or an email.

The invocation may be initiated by a SIP-enabled user terminal of one of the communicating peers. Alternatively, the invocation may be initiated by an Application Server linked to the established communication exchange.

In embodiments of the invention, the invocation further comprises the Correlation ID.

The invocation may further comprise the identity of the Auxiliary Service, and/or the identity of each of the communicating peers. The invocation may comprise: a SIP signal, such as SIP Subscribe Notify, SIP Refer, or a SIP Message; or an XML/HTTP signal; or an SMS signal.

In embodiments of the invention, the Correlation ID and/or the Application Classmark are comprised in: SIP message headers; values in existing SIP headers such as Feature Tags; or XML Bodies carried in SIP Messages and/or or other session-less delivery methods such as an SMS message, an MMS message or an email.

The method may further comprise correlating the Auxiliary Service media data with the established communication and presenting the correlated Auxiliary Service media data to the recipient peer. The method may further comprise retrieving data from one or more data sources prior to preparing and forwarding the Auxiliary Service media data.

In embodiments of the invention the Auxiliary Service is a data mining service. The Auxiliary Service may be: a caller ID presentation service; or a service for adding media that are being transmitted via a separate SIP session.

According to a second aspect of the present invention there is provided an Auxiliary Application Server (AS) configured to provide an SIP-based Auxiliary Service to a peer of an established communication. The AS is configured to prepare data for the Auxiliary Service and forward the data to the peer together with a Correlation ID identifying the established communication and an Application Classmark identifying the data as Auxiliary Service data.

In embodiments of the invention, the Auxiliary AS is configured to provide the Auxiliary Service in response to receipt of an invocation. The Auxiliary AS may be further configured to retrieve data from one or more data sources prior to preparing and forwarding the auxiliary service data.

The Auxiliary AS may be configured to provide a data mining service. The Auxiliary AS may be configured to provide a caller ID presentation service; or a service for adding media that are being transmitted via a separate communication.

It is an advantage that the present invention provides a method and network architecture where Auxiliary Services can be invoked at any time during the life-time of an on-going communication, and not only during call establishment phase. Moreover, the invention provides a solution to overcome the race-conditions problem that may occur when a subsequent/auxiliary session/transaction arrives prior to the main session/transaction.

According to a third aspect of the present invention there is provided a SIP-enabled user terminal configured to receive incoming SIP communications and Auxiliary Service data, identified by an Application Classmark and carrying a correlation ID identifying an established communication. The user terminal is configured to correlate the Auxiliary Service data with an in-coming communication identified as the established communication by the correlation ID, and to present the Auxiliary Service data to the user in association with the established communication.

The established communication may be an established SIP Session. Alternatively, the established communication may be a session-less transaction. The session-less transaction may comprise a SIP Message, an SMS message, an MMS message or an email.

The user terminal may be configured to suppress alerting of a new session when receiving the Auxiliary Service data identified as such by the Application Classmark.

The user terminal may be further configured to initiate an invocation for the provision of the Auxiliary Service.

DETAILED DESCRIPTION

The present invention is concerned with being able to provide an auxiliary service. In this respect, an auxiliary service is a service that can be called upon by another service, when required in a service execution context. The auxiliary service performs its task over a subsequent/auxiliary SIP session/transaction associated with an existing service that is being processed within either a SIP session or a SIP session-less transaction. Some examples of services that could be provided in this way include:

Calling ID presentations—a multimedia service for presenting information content relating to the caller to the recipient of the call or SIP transaction. For example the information content could be a picture, text, or video clip.

"Data mining" applications that search for and present information about a caller to the recipient, e.g. by searching a company database holding customer information.

The ability to add media (e.g. pictures from a camera) that are being transmitted via a separate SIP session to an already ongoing SIP session, without changing the topology of the existing call/session. For example, this might be pictures from a camera used for surveillance purposes.

Figure 3:
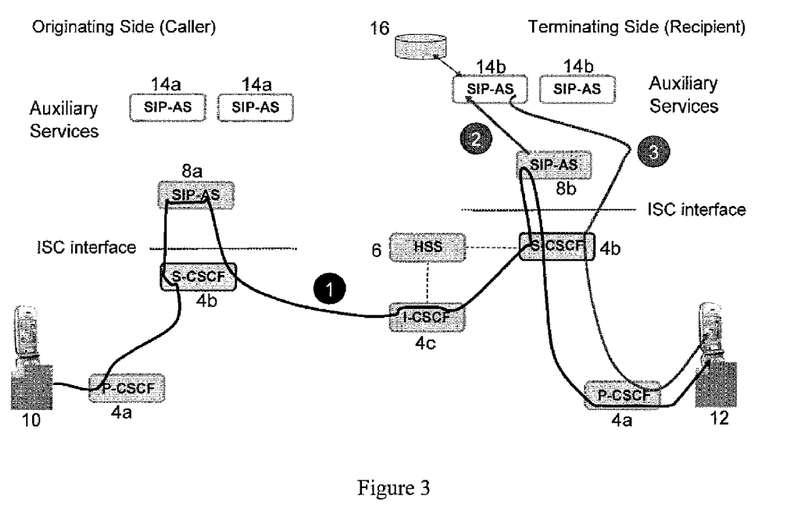
FIG. 3 is a schematic illustration of a session path during a SIP session in accordance with an embodiment of the invention.

FIG. 3 is a schematic illustration of a session path during a SIP session in accordance with an embodiment of the invention, in which equivalent features to those previously described with reference to FIG. 2 carry the same reference numerals. FIG. 3 shows the principle for Auxiliary service delivery over a separate SIP session (herein referred to as the Auxiliary Session) that is correlated to a another SIP session (herein referred to as the Main Session).

As shown in FIG. 3, in addition to the Application Servers 8a, 8b, that are linked in to the session in the establishment phase (as described above with reference to FIG. 2), auxiliary services are provided from one or more Auxiliary Application Severs 14a, 14b. A SIP session, the Main Session, is established between the two peers, the caller 10 and recipient 12, as shown by the message path indicated by the encircled numeral 1. This session may be established for a standardized service according to the 3GPP Communication Services concept, or for another type of service. As before, Application Servers 8a, 8b are linked in (invoked) over the ISC interface on the originating and terminating sides. For example, the ASs 8a, 8b could be for the MMTel communication service. When the call set up reaches the recipient terminal 12 the terminal will typically generate an alert (ring tone) to call for the recipient's attention.

As explained above, although this example is described with reference to FIG. 3 for the case of a SIP session between the two peers, as would be established by a SIP INVITE, the principles of the invention could just as easily apply to a session-less transaction such as a SIP MESSAGE, or for communications involving several SIP MESSAGEs sent back and forth in an interactive manner, such as might occur in a game communication between the two peers. In other words, the auxiliary service can be established either in association with a session-less SIP MESSAGE (or alternative communication means e.g. SMS, MMS, e-mail style of communication), or with a SIP session (e.g. two-way telephone call style of communication, involving ringing, answering etc.).

To illustrate the underlying principles of the invention, let us suppose that the recipient 12 subscribes to a data mining service provided by the IMS. The Application Server 8b on the terminating side that was invoked over the ISO interface for the Main Session, requests the data mining auxiliary service from an Auxiliary AS 14b. This is shown by the message path indicated by the encircled numeral 2. The Auxiliary AS 14b accesses a database 16 to obtain data about the caller 10. Although only one database 16 is shown in this example, the Auxiliary AS 14b could access several data bases to obtain as much data as possible about the caller 10. When all data is available and processed by the Auxiliary Service, the data is prepared for presentation at the recipient's terminal. The presentation format may vary from service to service, for example as a text file, or text together with pictures (e.g. xHtml, XML based), etc.

The invoked Auxiliary Server 14b establishes an Auxiliary Session to deliver the data to the recipient terminal. The message path is indicated by the encircled numeral 3 in FIG. 3. This additional, or auxiliary, SIP session must be correlated to the Main Session to allow the recipient terminal to understand that the Auxiliary Session should be treated in a specific way, for example to suppress ringing because it is not a new call that the called party must react to. Instead it is used to deliver information (services) related to an already established call (session).

In order for this to occur, the following mechanisms are implemented:

A mechanism to invoke an Auxiliary Service;
A way to correlate the Auxiliary Session with the Main Session; and
A mechanism to instruct the recipient terminal that an incoming SIP session/transaction is an Auxiliary Session to a Main Session.

In the example shown in FIG. 3, the Auxiliary Service was invoked by an Application Server 8b. However, Auxiliary Services may also be invoked by other entities, such as terminals (end-points), or any entity that determines that support is needed from an Auxiliary Service. For example, the request to provide data about the caller to the recipient in the example above could also be invoked by an application in the recipient terminal 12. What is required is that the entity sends a signal to trigger the invocation of the Auxiliary Service. Many different types of signal could be used for the invocation, for example:

A SIP signal, such as: SIP Subscribe Notify; SIP Refer; or a SIP Message;
XML/HTTP signal
SMS signal.

The most suitable signalling method may depend on the service being invoked and where it is invoked from.

The invocation signal needs to include the identity of the recipient peer of the Auxiliary Service, and also the identity of the call that the Auxiliary Service relates to, which this is referred to herein as the Correlation ID, and is described further below. The invocation may also need to include the identity of the Auxiliary Service (name of the Auxiliary Service), and, depending on the Auxiliary Service being provided, the identities of one or more of the other peers involved in a call. For example, if the service is one that provides Caller ID presentations to the recipient of the call or SIP transaction, or is a "data mining" application, then the identity of the calling peer will need to be included in the invocation.

In order to correlate the Auxiliary Session with the Main Session and to be able to instruct the recipient terminal that an incoming SIP session/transaction is from an Auxiliary Service, it is necessary to be able to distinguish an Auxiliary Session from a Main Session/transaction. To do this, the following two new information elements are introduced into the SIP initial messages (Invite, Message, etc) used to initiate a session/transaction.

A Correlation ID identifies the original/main communication (established either as a session or as a session-less transaction). The Correlation ID can then be re-used in any subsequent/auxiliary communications (established either as a session or session-less transaction) to refer to the original/main session/transaction. In this way, a receiving device can present the auxiliary service data as part of, or on top of the main session media. For example, if the auxiliary service data is video or text, it can be displayed in the same display window as video or text in the original/main session/transaction. The Correlation ID is similar in certain respects to the MCS Qualifier referred to above and briefly described in WO2006/125471. However, unlike the MCS Qualifier, the Correlation ID can be used by an entity that is not one of the peers in the Main Session and does not need to be implemented as a Feature Tag (although a Feature Tag implementation is one possibility).

An Application Classmark in the form of an enumeration or text string describing the application that the session/transaction is intended for. Thus, for example, for an Auxiliary Session/transaction the Application Classmark might have the value "Auxiliary Service". When the recipient's terminal receives the Auxiliary Service data, identified by the Application Classmark, it can suppress alerting of the end-user (ringing of the recipient terminal). Also, if the auxiliary service data is received before the main session data, the terminal can hold the data and wait until the original/main session/transaction arrives before presenting it. In the data mining example above, if the auxiliary service sends a picture of the caller to the recipient and this arrives before the main call, the recipient's terminal will wait until the main session is communication is established before presenting the caller's picture.

There are various ways that these two new information elements, the Correlation ID and the Application Classmark, may be introduced. These include: new SIP headers; values in existing SIP headers (for example as Feature Tags); or XML Bodies carried in existing SIP Messages.

There are certain Service Identifiers already defined by 3GPP—a Communication Service ID (ICSI) and an Application Reference (IARI)—for service identification purposes. ICSI identifies standardized communication services such as MMTel. IARI identifies applications that use Communication Services to establish connectivity between peers. An Auxiliary Service may use a communication service to establish connectivity to the receiver of the auxiliary service, by setting ICSI to the desired value. IARI can be used to identify an Auxiliary Service in a recipient terminal. If the Auxiliary Service is implemented as a "sub function" of another application (e.g. the application that is controlling the Main Session), this application can register itself in the terminal's application registry for the IARI value of the Auxiliary Service. Likewise, a standalone helper application can register itself for the IARI if this is found more appropriate (e.g. if the helper application is used in conjunction with several applications).

Figure 4:
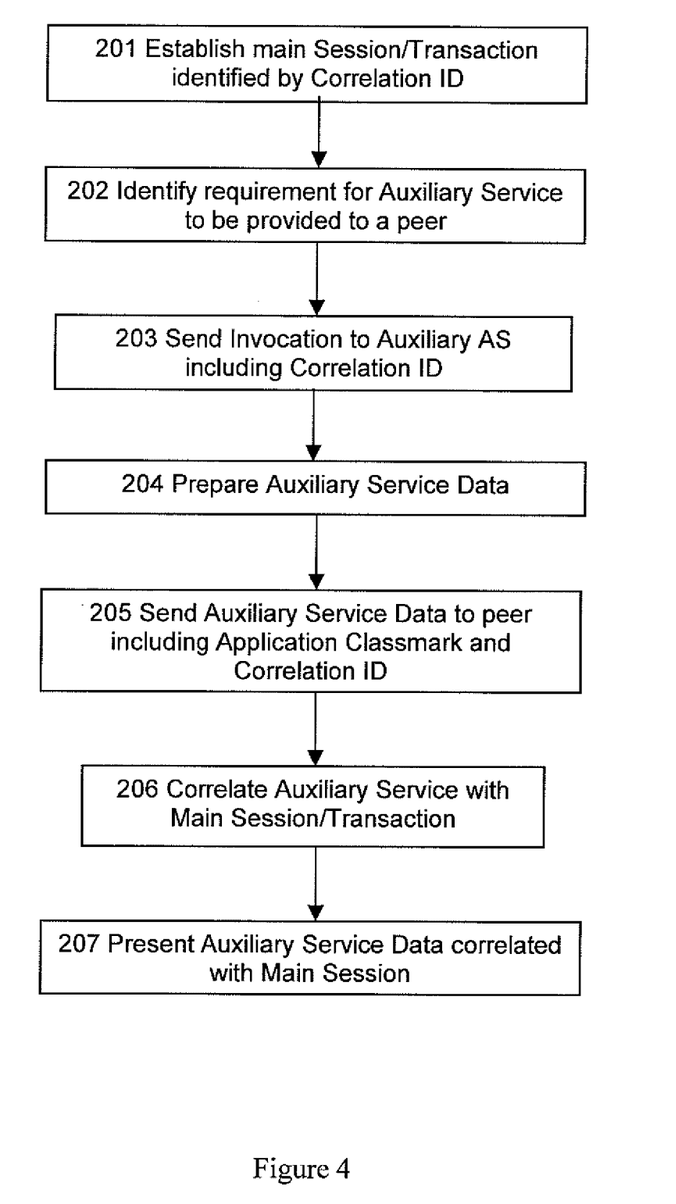
FIG. 4 is a flow diagram illustrating method steps in accordance with an embodiment of the invention.

FIG. 4 illustrates the steps in the method of providing an auxiliary service to a peer. At step 201 the main Session or transaction is established between the communicating peers. In accordance with the invention, the session establishment now includes the specification of an ID for the Main Session. At step 202 it is identified that an Auxiliary Service is required. In other words one, or more, of the peers needs to be provided with an Auxiliary Service. As explained above this requirement may be identified by one of the peers, or may be identified elsewhere, for example by an AS providing a service in the Main Session. Having identified the requirement for the Auxiliary Service, at step 203 an invocation is sent to the Auxiliary AS that controls the Auxiliary Service. As indicated above, the invocation may be sent by, or on behalf of, the entity that identified the requirement at step 202. For example, if an AS linked in to the Main Session identifies the requirement for an Auxiliary Service, then, as shown in FIG. 3, that AS may send the invocation to the Auxiliary AS. Alternatively, if one of the communicating peers identifies the requirement for provision of an Auxiliary Service, then it sends a request to the AS via the IMS. The request would then be sent to the Auxiliary AS for invocation of the Auxiliary Service. The invocation includes the Correlation ID identifying the Main Session.

On receiving the invocation, at step 204 the Auxiliary AS prepares the Auxiliary Service Data. For example, as described above, this could involve retrieving data from one or more databases. At step 205, the Auxiliary AS sends the Auxiliary Service data to the peer(s). This data is sent together with the Application classmark of the Auxiliary Service, and the Correlation ID of the Main Session.

When the Auxiliary Service data is received at the peer's terminal, it knows from the Application Classmark that it is Auxiliary Service Data, and from the Correlation ID, it knows the identity of the Main Session with which the Auxiliary Service data is to be correlated. Therefore the terminal will not treat the arrival of the data as an attempt set up a new session, and will not, for example, start ringing. Instead, at step 206, it will correlate the Auxiliary Service data with the established Main Session or transaction, and, at step 207, present the data in the appropriate form, depending on the media type.

The invention claimed is:

1. A method of providing media data of a Session Initiation Protocol (SIP)-based Auxiliary Service from an Auxiliary Application Server (AS) to a recipient peer of an established communication exchange between peers, wherein the Auxiliary Service is an additional service that was not invoked when the communication exchange was established, the method comprising:
   receiving an invocation at the Auxiliary AS, the invocation invoking the Auxiliary Service and including an indication of the recipient peer; and
   preparing and sending, to the recipient peer:
      Auxiliary Service data to be correlated with the established communication exchange, the Auxiliary Service data comprising the media data of the Auxiliary Service associated with media data provided by another service as a part of the established communication exchange; and
      correlation data for enabling the Auxiliary Service data to be correlated with the established communication exchange, the correlation data being distinct from, and sent together with, the Auxiliary Service data, and comprising:
         a correlation identity (ID) that identifies the established communication exchange; and
         an Application Classmark that identifies the Auxiliary Service data as data to be added to the established communication exchange;
   holding the Auxiliary Service data at the recipient peer until the associated media data provided by the another service has been received in the established communication exchange before presenting the Auxiliary Service data.

2. The method of claim 1 wherein the established communication exchange comprises a SIP session.

3. The method of claim 1 wherein the established communication exchange comprises a session-less transaction.

4. The method of claim 3 wherein the session-less transaction comprises at least one of a SIP Message, a Short Message Service (SMS) message, a Multimedia Messaging Service (MMS) message, and an email.

5. The method of claim 1 wherein receiving the invocation comprises receiving the invocation from a SIP-enabled user terminal of one of said peers.

6. The method of claim 1 wherein receiving the invocation comprises receiving the invocation from an Application Server linked to the established communication exchange.

7. The method of claim 1 wherein the invocation further includes the Correlation ID.

8. The method of claim 1 wherein the invocation further includes at least one of:
   an identity of the Auxiliary Service; and
   an identity of each of said peers.

9. The method of claim 1 wherein the invocation comprises either:
a SIP signal;
an Extensible Markup Language/Hypertext Transfer Protocol (XML/HTTP) signal; or
a SMS signal.

10. The method of claim 1 wherein at least one of the Correlation ID and the Application Classmark are comprised in either:
SIP message headers;
values in existing SIP headers; or
XML Bodies carried in at least one of SIP Messages, SMS messages, MMS messages and emails.

11. The method of claim 1 further comprising retrieving data from one or more data sources prior to preparing and forwarding said media data.

12. The method of claim 11 wherein the Auxiliary Service is a data mining service.

13. The method of claim 1 wherein the Auxiliary Service is either a caller ID presentation service or a service for adding media to the established communication exchange that is transmitted via a separate SIP session.

14. An Auxiliary Application Server (AS) for providing media data of a Session Initiation Protocol (SIP)-based Auxiliary Service to a recipient peer of an established communication exchange, wherein the Auxiliary Service is an additional service that was not invoked when the communication exchange was established, wherein the Auxiliary AS comprises:
a processor;
a memory storing Auxiliary Service data and programmatic instructions, wherein the processor executes programmatic instructions stored in the memory to:
prepare the Auxiliary Service data to be correlated with the established communication exchange, the Auxiliary Service data comprising the media data of the Auxiliary Service associated with media data provided by another service as a part of the established communication exchange; and
forward to the recipient peer:
the Auxiliary Service data; and
correlation data for enabling the Auxiliary Service data to be correlated with the established communication exchange, the correlation data being distinct from, and sent together with, the Auxiliary Service data, and comprising:
a Correlation identity (ID) that identifies said established communication exchange; and
an Application Classmark that identifies the Auxiliary Service data as data to be added to the established communication exchange, wherein the Auxiliary Service data is held at the recipient peer until the associated media data provided by the another service has been received in the established communication exchange before presenting the Auxiliary Service data.

15. The Auxiliary Application Server of claim 14 configured to prepare and forward the data responsive to receiving an invocation of the Auxiliary Service.

16. The Auxiliary Application Server of claim 14 further configured to retrieve data from one or more data sources prior to preparing and forwarding the auxiliary service data.

17. The Auxiliary Application Server of claim 14 configured to provide the Auxiliary Service as a data mining service.

18. The Auxiliary Application Server of claim 14 configured to provide the Auxiliary Service as either a caller ID presentation service or a service for adding media to the established communication exchange that is transmitted via a separate communication exchange.

19. A Session Initiation Protocol (SIP)-enabled user terminal comprising:
a processor; and
a memory storing programmatic instructions, wherein the processor executes programmatic instructions stored in the memory causing the SIP-enabled user terminal to:
receive incoming SIP communications of an established communication exchange;
receive, from an Auxiliary Application Server:
Auxiliary Service data to be correlated with the established communication exchange, the Auxiliary Service data comprising media data of an Auxiliary Service associated with media data provided by another service as a part of the established communication exchange, that was not invoked when the communication exchange was established; and
correlation data for enabling the Auxiliary Service data to be correlated with the established communication exchange, the correlation data being distinct from, and received together with, the Auxiliary Service data, and comprising:
a correlation identity (ID) that identifies the established communication exchange; and
an Application Classmark that identifies the Auxiliary Service data as data to be added to an established communication exchange identified by the correlation ID;
correlate the media data with an incoming communication associated with the established communication exchange and identified by the correlation ID;
hold the Auxiliary Service media data until the associated media data provided by the other service has been received in the established communication exchange; and present the media data to the user of said user terminal in association with the established communication exchange.

20. The SIP-enabled user terminal of claim 19 wherein the established communication exchange comprises an established SIP Session.

21. The SIP-enabled user terminal of claim 19 configured to, responsive to receiving said media data and said Application Classmark, identify the media data in accordance with the Application Classmark as media data that is to be added to an established communication exchange and correspondingly suppress alerting of a new session.

22. The SIP-enabled user terminal of claim 19 wherein the established communication exchange comprises a sessionless transaction.

23. The SIP-enabled user terminal of claim 22 wherein the session-less transaction comprises a SIP Message, an SMS message, an MMS message, or an email.

24. The SIP-enabled user terminal of claim 19 further configured to initiate an invocation for the provision of the Auxiliary Service.

* * * * *